HYBRID BRANCHING NETWORKS

Filed Dec. 6, 1957 2 Sheets-Sheet 1

INVENTOR
S. W. AUTREY
BY W. L. Keefauver
ATTORNEY

INVENTOR
S. W. AUTREY
BY W. L. Keefauver
ATTORNEY

United States Patent Office 2,938,084

Patented May 24, 1960

2,938,084

HYBRID BRANCHING NETWORKS

Samuel W. Autrey, Summit, N.J., assignor to Bell Telephone Laboratories, Incorporated, New York, N.Y., a corporation of New York Filed Dec. 6, 1957, Ser. No. 701,177

7 Claims. (Cl. 179—170)

The invention relates to repeaters for two-way communication systems and, more particularly, to equivalent four-wire repeaters having improved transmission characteristics.

In a carrier signal transmission system, it is frequently desirable to transmit signals in both directions over a single pair of conductors. Such a system is termed an equivalent four-wire transmission system because bilateral transmission, usually requiring four separate wires, is accomplished with only two wires. Equivalent four-wire systems are particularly desirable in long transmission systems where the apparatus is relatively inaccessible, for example, a submarine cable system. Since an equivalent four-wire system provides two-way communication with only half as much cable as a physical four-wire system, the probability of loss of communication through cable failure is only half as great. Furthermore, if the growth rate of such a system is low, additional circuits may be added most economically with the equivalent four-wire system.

A repeater commonly used for equivalent four-wire systems is the so-called 21-type repeater which in its simplest form includes high-pass and low-pass filters connected between the input side of a unilateral amplifier and the respective two-wire lines and similar high-pass and low-pass filters connected between the output side of the amplifier and the opposite ones of the respective two-wire lines. In a system using such a repeater, different carrier frequency bands are used for the two directions of transmission. In the repeater, carrier frequency signals traveling in one direction are routed through the unilateral amplifier by way of the high-pass filters, while those traveling in the opposite direction are routed by way of the low-pass filters.

Unfortunately, a 21-type repeater such as that described above includes a pair of inherent feedback paths outside of the unilateral amplifier. Each of these feedback paths includes a high-pass and a low-pass filter connected in series between the input and output sides of the amplifier. In a long transmission system, these feedback impose relatively severe discrimination requirements on the filters. In the first place, the filters must introduce a sufficient amount of loss outside of their pass bands to provide a satisfactory margin against singing. Since feedback tends to alter the gain of the amplifier, however, even more important is the requirement that the filter losses outside of their pass bands be high enough so that the deviation or misalignment of the entire system is kept within reasonable limits. This second requirement is particularly severe in long submarine cable systems since not only is the number of repeaters relatively large, but there is also little chance to equalize their misalignments at regular intervals. Since filters with high discrimination between frequencies within and without their nominal pass band tend to be complex and in a number of respects less reliable than simpler filters, any relatively simple way of relaxing such discrimination requirements without at the same time sacrificing repeater performance would be highly advantageous.

In the past, the usual approach to the problem has been to use hybrid connections at the junctions between the filters and the two-wire line. The balance obtained in this manner serves to reduce the filter discrimination requirements to acceptable levels. At the same time, however, a flat loss of about three decibels was added for each hybrid used, reducing the gain available for distortion-reducing amplifier feedback, decreasing the required repeater spacing in a long system and aggrevating misalignment problems. In adidtion, the use of hybrids adversely affected the impedance match between the 21-type repeater and the two-wire transmission lines to which it was connected. Thus, at each end of the repeater the impedance of one filter in its pass band approximates a pure resistance and the impedance of the other filter outside its pass band approximates a pure reactance. The impedance presented by the hybrid therefore cannot match a cable which is designed to have an impedance approximating a pure resistance at carrier frequencies.

In overcoming the impedance matching problem, use has been made of a so-called Bobis type eight-terminal filter disclosed in S. Bobis Patent 2,044,047, issued June 16, 1936. At microwave frequencies this circuit has also been referred to as a hybrid frequency branching circuit and is disclosed in this aspect in W. D. Lewis Patent 2,561,212, issued July 17, 1951. This circuit, shown in schematic form in Fig. 1, in general comprises two hybrid means each having two pairs of mutually conjugate transmission paths. Connected between respective single paths of one of these pairs of each hybrid means are two filters having the same pass band but providing mutually inverse characteristics outside of this common pass band. The remaining four transmission paths or ports represent the external terminals of the network.

At microwave frequencies, the filters are structurally identical but one of them is spaced a quarter wavelength further away from one of the hybrid means than the other filter. At lower frequencies these filters are of the inverse type. The inverse filters are so related to one another that at any frequency outside their common passband the impedance presented by one of the filters is substantially equal to the inverse of the impedance of the other filter at the same frequency, and both filters present the same resistance within their common pass band. Structurally, inverse filters are filters in which each series arm capacitor in one filter is replaced by a shunt arm inductor in the other; each series arm inductor in one filter is replaced by a shunt arm capacitor in the other; each series arm combination of an inductor and a capacitor in series in one filter is replaced by a shunt arm combination of a capacitor and an inductor in parallel in the other filter; and so forth.

The properties of the network shown in Fig. 1 are such that a signal introduced at any one of the ports will be delivered to a second port if it is within the pass band of the filters but will be delivered to a third port if it is not within the pass band of the filters. Furthermore, each of the ports presents a fixed resistance for all frequencies provided the remainder of the ports are themselves properly terminated by suitable resistances. The exact operation of this circuit will hereinafter be more fully described.

In the copending application of T. L. Maione, Serial No. 631,148, filed December 28, 1956, since matured into U.S. Patent 2,875,283, issued February 24, 1959, there is shown a combination of at least two frequency branching networks of the Bobis type. Each one of two ports of one Bobis network is connected to respective ones of two ports of the other Bobis network. A unilateral amplifier is connected between one of the remaining two ports of the first network and one of the remaining two ports of the second network. The single port remaining on each of the networks is connected to a respective one of the transmission lines. A bilateral repeater is thus formed in which a signal delivered by one of the transmission lines, which signal is within the pass bands of the filters, is routed through the amplifier in the same direction as a signal outside the pass band of the filters delivered by the other transmission lines. In this arrangement, it will be noted that all of the ports of both networks are, or easily can be, resistively terminated, either by corresponding ports of the other network, by the unilateral amplifier or by the transmission lines. Therefore, with this arrangement, not only can all of the filters be designed with identical pass bands, but the amplifier and the transmission lines can also be designed to have the same resistive input and output impedances. No trans-hybrid losses are incurred with this arrangement while the balance available with the hybrid is retained to reduce the filter discrimination requirements. This type of repeater will hereinafter be referred to as a constant resistance repeater.

From one point of view, the constant resistance type of repeater provides all of the advantages of the use of hybrids to assist the band-splitting filters in a 21-type repeater without incurring any of its disadvantages. Each branching network of the type featured provides a balance similar to that provided by the conventional hybrid connection, thus permitting relaxation of filter discrimination requirements. At the same time, however, each network feeds the whole of its output to the unilateral amplifier, thus avoiding the flat trans-hybrid loss normally incurred in hybrid connections. The relaxed filter discrimination requirements provided by this arrangement permit the use of somewhat simpler filter structures which are in turn more reliable than more complex structures because there are fewer elements in which failures can occur. Such simple filter structures, however, have certain disadvantages for use in the constant resistance bilateral repeater. This repeater, as will be shown below, depends to a large extent upon the phase relationship of signal components. The phase of the transmission ratio of simple filter structures such as those contemplated tends to vary through a wide range. That is, at frequencies within the pass band of the filter, transmitted components will experience a significant phase shift. If the amount of this phase shift is just sufficient to make certain components returning to a hybrid by spurious transmission paths in phase, ripples are introduced into the overall transmission characteristic of the repeater.

A principal object of the present invention therefore is to reduce the effect of spurious transmission paths in an equivalent four-wire repeater employing frequency branching circuits of the constant resistance type.

It is another object of the invention to reduce the filter discrimination requirements in a constant resistance equivalent four-wire repeater without increasing the level of spurious signals.

It is more a specific object of the invention to compensate for undesired transmission paths in an equivalent four-wire repeater of the constant resistance type.

In accordance with the present invention, an impedance network is inserted in only one arm of each constant resistance frequency branching network. The impedance of this network is chosen so as to unbalance the signals in these hybrid arms a sufficient amount to cancel the spurious signals which would otherwise be fed to the amplifier input. That is, one of two balanced signals is attenuated sufficiently to cause an unbalance of these two signals. The amount of this unbalance is chosen to be of just a sufficient magnitude to cancel spurious signals caused by certain reflected components of the main signal at particular discrete frequencies. If it is desired to compensate for spurious signals at only one frequency, a non-reactive, purely dissipative impedance is sufficient. If, however, it is desired to compensate for spurious signals at more than one frequency, an impedance must be chosen which is frequency shaped so as to have the proper value at all of the frequencies of interest.

The major advantage of the present invention arises from the reduced filter discrimination requirements which are possible with spurious signal compensation. Without such compensation, more complex filters would be required which in turn would be more costly and less reliable. The compensating network required is, on the other hand, of comparatively simple configuration comprising, for example, a simple resistive pad.

These and other objects and features, the nature of the present invention and its various advantages, will appear more fully upon consideration of the accompanying drawings and the following detailed description of the drawings.

Figure 1:
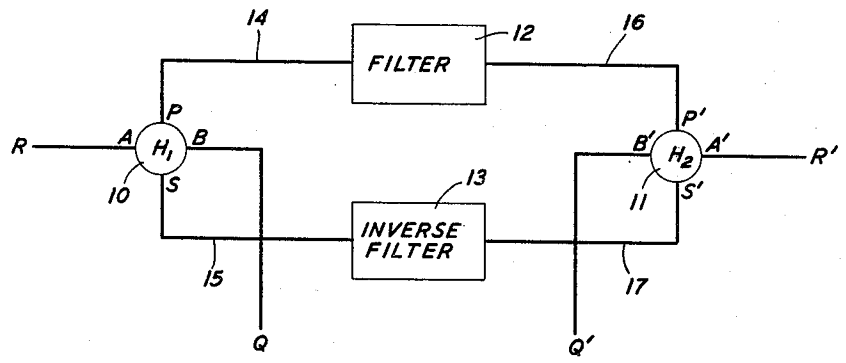
Fig. 1 is a schematic representation of a four-port or eight-terminal constant resistance frequency branching network of the type employed in the invention.

A basic hybrid branching circuit is shown in Fig. 1. The general function of such a unit is to segregate or branch signal components in a particular chosen frequency band from the signal components outside of that band. The branching circuit comprises a pair of hybrid means 10 and 11 each having two pairs of conjugately related arms A, B and P, S. Hybrid means 10 is arranged with the arms P and S connected to transmission lines 14 and 15, respectively, which are in turn connected to one end of filters 12 and 13. Filters 12 and 13 are designed to have identical pass bands and to reflect all frequencies not within the common pass band. Furthermore, the reflections provided by filters 12 and 13 are mutually inverse, that is, are substantially 180 degrees out of phase with respect to each other. Hybrid means 11 is arranged with arms P′ and S′ connected to transmission lines 16 and 17, respectively, which are in turn connected to the other end of filters 12 and 13.

Hybrid means 10 and 11 may be designed for operation at low frequencies, comprising in this case hybrid coils, or may be designed for microwave frequencies in which case they may comprise structures of a so-called wave guide junction or wave guide coaxial, or other transmission line loop structures. Whatever form of hybrid structure is employed, it should have four arms or branches associated in two pairs, each arm of a pair being conjugately related to the other arm of the same pair. For convenience here, a notation will be used in which the first pair of arms, or branches, will be designated A and B, respectively, and arms of the second pair will be designated P and S, respectively. The inherent properties of hybrid means are well known by which wave energy introduced into the hybrid from or by way of either arm of the first pair will produce no energy leaving the hybrid by way of the other arm of that pair, but the energy introduced will divide equally between the other pair of arms of the hybrid means. Furthermore, the signals representing the halves of the energy in each of the second pair of arms will be in phase if the energy is introduced by one arm A of the first pair, or 180 degrees out of phase if it is introduced by way of the other arm B of the first pair. Conversely, if equal wave energies are introduced in phase into the hybrid means by way of the two arms P and S of the second pair, they will combine in arm A of the first pair, no wave energy being transmitted to arm B. If equal wave energies 180 degrees out of phase are introduced into the hybrid means by way of the two arms P and S of the second pair, the wave energies will combine in arm B of the first pair, no wave energy being transmitted to arm A. As applied to the circuit of Fig. 1, this means that the wave energy entering arm A of hybrid means 10 by transmission line R will divide equally at all frequencies between transmission lines 14 and 15, the two portions leaving hybrid arms P and S being in phase with respect to each other.

If a signal including frequency components within the pass band of filters 12 and 13 is applied to transmission line R, this signal will divide equally between arms P and S. The components of the signal travel along lines 14 and 15 to the filters 12 and 13. At the filters, the frequency components within the pass band of the filters will pass therethrough to transmission lines 16 and 17, respectively. However, frequency components outside of the pass band of filters 12 and 13 will be reflected back down lines 14 and 15 and returned to hybrid means 10 by way of arms P and S. The reflected signals in these two arms will be 180 degrees out of phase with respect to their original phase relation when first leaving hybrid means 10, since one of the properties of filters 12 and 13 is to provide these mutually conjugate reflections. From the inherent properties of the hybrid means, it is apparent that the reflected waves will not appear in input transmission line R but will combine in arm B of hybrid means 10 and will appear in transmission line Q.

The half energy portions of the signal having frequency components within the pass band of filters 12 and 13 will pass freely therethrough to transmission lines 16 and 17, respectively, and thence to the second hybrid means 11. These two components of energy will arrive at hybrid means 11 at arms P′ and S′ without a change in their relative phase relations since filters 12 and 13 present identical pass band characteristics. They will combine in hybrid means 11 and pass out arm A′ to which transmission line R′ is connected.

Similarly, if a signal comprising a plurality of frequency components is applied through transmission line Q to arm B of hybrid means 10, components within the pass band of filters 12 and 13 will pass therethrough to hybrid means 11 and combine in arm B′ appearing in line Q′, while frequency components outside of the pass band of filters 12 and 13 will be reflected and combine in arm A of hybrid means 10, appearing in line R.

Since the schematic diagram of the frequency branching network is symmetrical, the general properties of the circuit may be briefly summarized in view of the above-described operation. Therefore, let each of the lines connected to the four arms R, Q, R′ and Q′ of the circuit be terminated in a characteristic impedance looking away from the network. Under these conditions this characteristic impedance will be seen looking toward the network from any one of the lines. When a signal having frequency components outside of the pass band of the filters and frequency components within the pass band of the filters is applied to the branching network by means of any line or lines, line R will be effectively connected to line R′ and line Q to line Q′ for the frequency components within the pass band of the filters. Line R will be effectively connected to line Q and line R′ to line Q′ for all frequency components outside of the pass band of the filters. Line R will always be balanced from or conjugate to line Q′ and line R′ from line Q.

Numerous physical embodiments of both low frequency and high frequency microwave components may be designed having required characteristics. For example, at low frequency, the hybrid means may comprise hybrid coils of the type well known to those skilled in the art such as, for example, a transformer with a center-tapped primary winding, and the filters may comprise those of the inverse type to be more fully described below. At high frequencies within the microwave range, the hybrid means may comprise magic-T wave guide junctions and the filters may be structurally identical combinations of posts, screws and irises, one filter being displaced from the hybrid junctions a quarter wave length of the reflected frequency components farther than the other one. These microwave components are more fully described in W. D. Lewis Patent 2,561,212, issued July 17, 1951, and in the references therein cited.

In the embodiment to be described, two of such hybrid branching networks are combined in order to accomplish the objects of the invention. Specifically, they are utilized to separate or branch signals at two different frequencies, each of which is used for a different direction of transmission in a carrier wave transmission system. This branching is necessary in order to route signals coming from opposite directions in the same direction through a unilateral amplifier.

Figure 2:
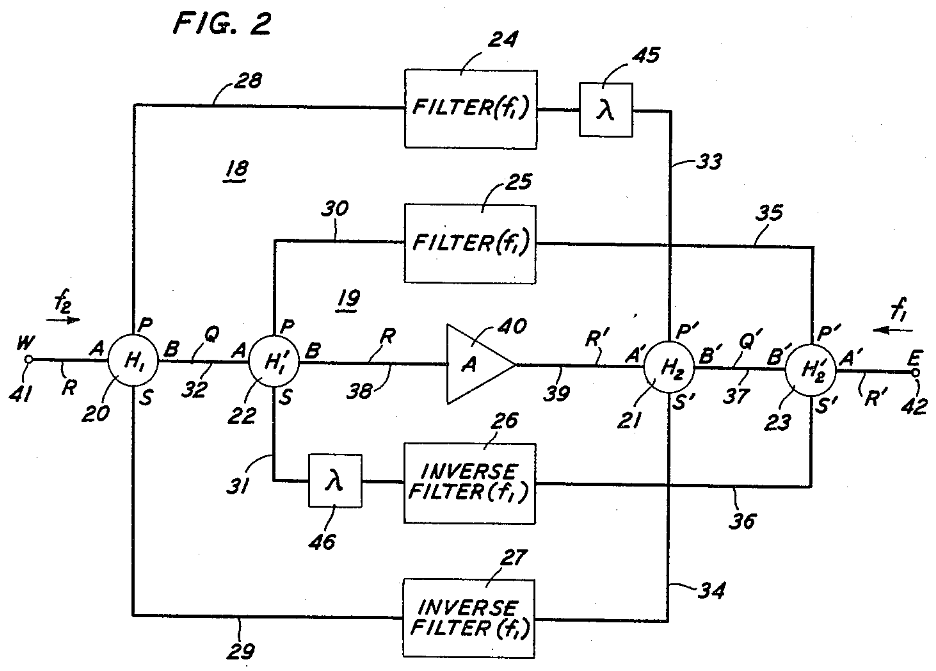
Fig. 2 is a schematic representation of a constant resistance equivalent four-wire repeater in accordance with the principles of the invention.

Consider therefore Fig. 2 which shows a constant resistance repeater suitable for use in a two-way transmission system operating with two frequency-spaced channels, one for each direction of transmission. The center frequency of one channel is frequency spaced from the other channel by at least the bandwidth of each channel. In many cases it will be desirable to leave some margin of separation or guard space between these channels, in which case the frequency spacing between the center frequencies will be somewhat greater than the bandwidth of each channel. The intelligence bearing signal to be amplified and transmitted in each direction comprises a band of signal side bands produced by modulating a carrier signal of frequency approximating the mid-band frequency of the channel with the intelligence signal by any of the well-known methods of modulation. The intelligence bearing signals may or may not include the carrier frequency depending on the particular type of modulation employed. In any event, it will be convenient in the following discussion to designate the intelligence bearing signals for each direction by the frequency of the mid-band component or carrier frequency. That is, the signal transmitted from W to E, or left to right, may be called signal component $f_2$ and the signal transmitted from E to W, or right to left, may be called signal component $f_1$. It should be remembered, however, that these "channels" may comprise a large group of actual communications channels capable, for example, of carrying hundreds of telephone conversations in each direction.

The repeater comprises two hybrid frequency branching networks 18 and 19. Networks 18 and 19 are identical to that shown in Fig. 1. Network 18 comprises two hybrid means 20 and 21 each having two pairs of mutually conjugate arms A, B and P, S in hybrid means 20 and A′, B′ and P′, S′ in hybrid means 21. Connected between each one of one pair of arms of hybrid means 20 and 21, respectively, that is, between arms P and P′ and between arms S and S′, are filters 24 and 27. Also connected between arms P and P′ is an impedance network 45, the function of which will hereinafter be described. Filter 27 has the identically same pass band as filter 24 which pass band includes frequency $f_1$, but provides a reflection outside of this pass band which is conjugate to the reflection provided by filter 24 outside of the common pass band.

Similarly, network 19 comprises two hybrid means 22 and 23, two arms of each of which are separated by mutually inverse filters 25 and 26, a second impedance network 46 being associated with filter 26. Branching networks 18 and 19 have all of the properties described with respect to the branching network of Fig. 1 and are connected together by their common transmission lines Q and Q′ shown at 32 and 37. Transmission line R of network 18 provides the west input and output terminal 41 while transmission line R′ of branching network 19 provides the east input and output terminal 42. A unilateral amplifier 40 is connected between branching networks 18 and 19 by way of transmission line R of branching network 19 shown at 38, and transmission line R′ of branching network 18, shown at 39. Amplifier 40 amplifies only those signals delivered by transmission line R of branching network 19 and traveling in the direction toward transmission line R′ of branching network 18. Amplifier 40 may be of any well-known design but is preferably of the negative feedback type providing high gain stability.

The operation of the repeater shown in Fig. 2 may be more readily understood by tracing the paths of the signals through the repeater. For this purpose, signal energy traveling from right to left is designated as $f_1$ and signal energy traveling from left to right is designated as $f_2$. Signal $f_1$ is within the common pass band of filters 24, 25, 26 and 27 while signal $f_2$ is outside of this common pass band. For convenience, it will initially be assumed that impedance networks 45 and 46 are not in the circuit, and that the filters are ideal components, i.e., they produce no reflections within their pass bands and no transmission outside their pass bands. The effect of these networks will be separately considered hereinafter.

Signal $f_1$ arrives at hybrid means 23 by way of transmission line R′ and splits equally between lines 35 and 36 with the portions in phase with respect to each other. These equal portions travel to filters 25 and 26 and pass therethrough because they are within their pass band. Continuing on through lines 30 and 31 these equal portions arrive at hybrid means 22 and combine in transmission line R since they are in phase. They are there introduced into amplifier 40 where they are given sufficient amplification to carry them to the next repeater station without excessive degradation of the signal content. They then pass to transmission line 39 and to hybrid means 21 where the amplified signals again split into two equal portions in lines 33 and 34. The amplified portions pass through filters 24 and 27 into lines 28 and 29. They are introduced into hybrid means 20 where they combine together in transmission line R and pass out to the west terminal 41 of the repeater. It can be seen that unamplified signals arriving at the east end of the repeater are amplified, traverse the repeater to the west end and pass on toward the next repeater station.

Signals traveling in the other direction from left to right and represented by $f_2$ are introduced at terminal 41 into transmission line R and into hybrid means 20. These signals split into equal in-phase portions in lines 28 and 29 and travel to filters 24 and 27. Since these signals are not within the pass bands of these filters, they are reflected and, furthermore, due to the nature of the filters, are reflected 180 degrees out of phase with respect to each other. Therefore, upon arrival back at hybrid means 20, they combine in transmission line 32 rather than line 41. In hybrid means 22, they again split in lines 30 and 31, are reflected by filters 25 and 26 and recombine in line 38. The signals are now amplified in amplifier 40 and introduced into hybrid means 21. The amplified signal splits into two equal portions in lines 33 and 34, is reflected by filters 24 and 27 and recombines in line 37. In hybrid means 23, the signal splits in lines 35 and 36, is reflected by filters 25 and 26 and recombines in line R′ where it is passed on by way of east terminal 42 to the next repeater station in the east direction.

It can be seen from the above that high and low level signals at the same frequency are not present at the same place in the repeater. Furthermore, each of the four terminals of the frequency branching networks are terminated by constant resistances at all frequencies. Terminals R of network 18 and R′ of network 19 are connected to transmission lines which are normally designed to present resistances at the carrier frequencies. Terminals Q and Q′ of both networks are connected to each other. Terminals R of network 19 and terminal R′ of network 18 are connected to the unilateral amplifier which may easily be designed to have constant resistance input and output impedances. With this arrangement, all filters are balanced and the filter discrimination requirements are thereby lessened. All connections are made between constant resistances which may be designed to be the same resistances for all frequencies of interest. Furthermore, no trans-hybrid loss is taken at any of the hybrid means so that the entire gain of the amplifier is available for distortion-reducing feedback within the repeater and for raising the output of the repeater to maximum level. The basic constant resistance equivalent four-wire repeater described above is the subject matter of the above-mentioned T. L. Maione copending application, Serial No. 631,148, filed December 18, 1956, since matured into U.S. Patent 2,875,283, issued February 24, 1959.

It will be remembered that the above-described operation of the constant resistance repeater shown in Fig. 2 was based on the assumption that the filters were ideal components, i.e., they produced no reflections within their pass bands and permitted no transmission outside their pass bands. Such filters are, of course, impossible to realize physically, particularly with a simple configuration such as that contemplated here. These filters can therefore be more accurately characterized by two transmission constants, a transmission ratio $t$, representing that portion of the incident signal which is transmitted through the filter, and a reflection coefficient $\rho$, representing that portion of the incident signal which is reflected by the filter. Since the filters shown in Fig. 2 are either identical or inverse, the transmission ratio $t$ is substantially the same for all the filters and is equal to a quantity close to, but less than, unity within the pass bands of the filters, and is equal to a very small quantity outside of the pass band of the filters. The absolute value of $\rho$ is also substantially the same for all of the filters but is equal to a very small quantity within the pass bands of the filters and is equal to a quantity close to, but less than, unity outside of the pass band of the filters. Moreover, the reflection coefficient $\rho$ has a positive sign for filters 24 and 25 and a negative sign for inverse filters 26 and 27.

It can thus be seen that the signal emerging from any one of the filters is equal to $t$ times the incident signal. Similarly, the signal reflected from any one of the filters is equal to $\rho$ times the incident signal and has a positive sign when reflected from filter 24 or 25 and a negative sign when reflected from inverse filter 26 or 27.

With these facts in mind, the signal transmissions in the constant resistance repeater shown in Fig. 2 can be considered more accurately, particularly transmission between terminal 42, the east input and output terminal, and transmission line 38, the input to amplifier 40. The reason for choosing this transmission path will be made evident below.

As discussed above, a signal at frequency $f_1$ entering the repeater at terminal 42 is split in hybrid 23 between transmission lines 35 and 36 such that one-half the signal energy travels to filter 25 and one-half to inverse filter 26, still assuming network 45 is not in the circuit. The major portion of this incident signal passes through filter 25 and inverse filter 26 and is combined by hybrid 22 in transmission line 38. This portion of the signal is equal to the transmission ratio $t$ times the signal energy incident on the east terminal 42 of the repeater.

A small portion of the incident signal energy, however, is reflected by filter 25 and inverse filter 26 and returns to hybrid 23. This portion is equal to the reflection coefficient $\rho$ times the incident signal. These reflected signal components combine in phase in transmission line 37, pass to hybrid 21 and are split again between transmission lines 33 and 34. The major portions of these components traverse filter 24 and inverse filter 27 and are combined in transmission line 32 by hybrid 20 with a value $\rho t$, assuming, for purposes of convenience, that the amplitude of the incident signal is unity. This signal energy splits in hybrid 22 and is incident upon filter 25 and inverse filter 26 by way of transmission lines 30 and 31, respectively. Again, the major portion of this signal energy traverses filter 25 and inverse filter 26. A small portion, however, is reflected back to hybrid 22 where it combines in transmission line 38 with a value $\rho^2 t$. This component represents a spurious signal which must be added to the direct transmission $t$ from terminal 42 to transmission line 38 to give a transmission of $$T_1 = t + \rho^2 t \quad (1)$$

times the incident signal, where $T_1$ is a first approximation of the total transmission from terminal 42 to line 38.

Returning to the reflected signal components traversing filter 26 and inverse filter 27, it can be seen that these components are combined in transmission line 37 by hybrid 23 with a value $\rho t^2$. This signal energy is split by hybrid 23 between transmission lines 35 and 36 in exactly the same manner as the originally incident signal but these components have opposite signs. It is evident that this signal energy traverses the same transmission path as the originally incident signal and thus generates an additional signal in transmission line 38 equal to minus $\rho^2 t^3$. It can be seen that an infinite series of spurious signals is formed in which successive terms have opposite signs and are equal to the preceding term times $t^2$. The total transmission between terminal 42 and transmission line 38 therefore becomes $$T = t + \rho^2 t - \rho^2 t^3 + \rho^2 t^5 - \ldots \quad (2)$$

This infinite series is convergent so that Equation 2 reduces to $$T = t\left[1 + \frac{\rho^2}{1+t^2}\right] \quad (3)$$

Since the value of $\rho$ is normally very small and $t$ is close to unity within frequency range $f_1$, the second term in Equation 3, representing spurious signal transmissions, can normally be neglected. However, the transmission through any filter is accompanied by a phase shift. This phase shift, a characteristic of the transmission ratio $t$, varies through nearly 360 degrees as the actual frequency of the incident signal varies within the pass band of the filters. This variation can be better appreciated by considering Fig. 3 which shows a graphically and qualitative representation of the phase versus frequency characteristic of the transmission ratio $t$ of a typical filter structure.

Figure 3:
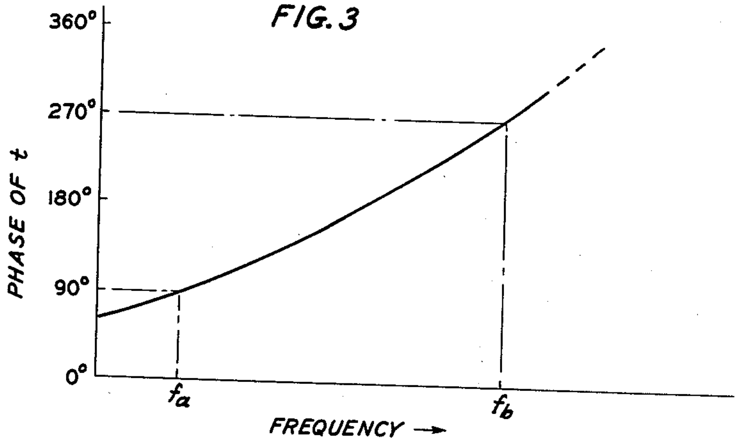
Fig. 3 is a graphical and qualitative representation of the pass band phase shift versus frequency characteristic of the transmission ratio $t$ of the filters showing in Fig. 2.
Figure 4:
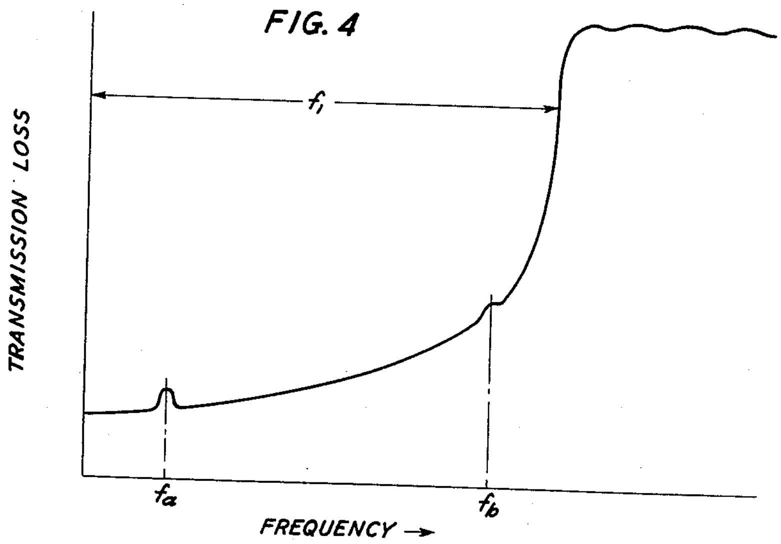
Fig. 4 is a graphical and qualitative representation of the transmission loss versus frequency characteristic of a portion of the repeater shown in Fig. 2.

When the phase of $t$ is equal to 90 degrees or 270 degrees, as shown at frequencies $f_a$ and $f_b$, respectively, in Fig. 3, the denominator of the second term of Equation 3 becomes extremely small and this term is no longer negligible. Thus, at the frequencies $f_a$ and $f_b$ for which $t$ has the proper phase, a ripple occurs in the transmission loss versus frequency characteristic of this portion of the constant resistance repeater. This effect is shown more clearly in the graph of Fig. 4, illustrating this transmission loss versus frequency characteristic.

At the particular frequencies $f_a$ and $f_b$ for which the phase of $t$ is equal to 90 degrees or 270 degrees, $t^2$ becomes substantially equal to minus one. Under this condition, it can easily be seen by inspection of Equation 3 that the denominator of the second term becomes exceedingly small and the second term itself becomes significant. Since this change in T occurs at discrete frequencies, ripples are found in the transmission loss versus frequency characteristic of this transmission path. Since the transmission path between transmission line 39 and west terminal 41 is identical to that between east terminal 42 and transmission line 38, the magnitude of these ripples in the overall gain versus frequency characteristics of the repeater are doubled in traversing the entire repeater from terminal 42 to terminal 41. The transmission from terminal 41 to terminal 42 does not experience these ripples because this transmission path does not depend upon transmission through the filters but rather upon reflection from the filters.

The ripples in the gain versus frequency characteristic of the overall repeater are undesirable because of the distortion which they introduce into the transmitted signal. Furthermore, if a large number of these repeaters are cascaded, for example, in a long submarine cable, these distortion effects are enhanced in direct proportion to the number of repeaters and through transmission becomes impossible. It is therefore desirable to reduce or eliminate these gain ripples with as little added complexity as possible. The present invention is directed toward this result.

In accordance with the present invention, an impedance network 45 is interposed in the constant resistance repeater circuit of Fig. 2 in transmission line 33 between filter 24 and hybrid 21. Similarly, a second impedance network 46 is interposed in transmission line 31 between inverse filter 26 and hybrid 22. Since the configuration of Fig. 2 is symmetrical, impedance networks 45 and 46 may just as well be interposed in transmission lines 34 and 30, transmission lines 28 and 36 or in transmission lines 29 and 35. In any event, impedance networks 45 and 46 are substantially identical and are interposed in only one arm of each of hybrid frequency branching networks 18 and 19.

In the preferred embodiment, impedance networks 45 and 46 are purely dissipative impedances, that is, they are merely attenuation pads. It is apparent that the only effect of these dissipative impedances is to unbalance the signal energies in the two arms of the hybrid networks 18 and 19. The effect of this unbalance is to cause only a portion of the energy returning to the hybrids to combine in the same transmission line as they would otherwise combine in. The balance of the returning energy will combine in the transmission line conjugate to the first one. Thus a signal entering the repeater at terminal 42 and splitting in hybrid 23 will traverse filter 25 and inverse filter 26 in the same manner as before. The half energy portion in transmission line 31, however, will be attenuated by impedance network 46. At hybrid 22 these signals in line 30 and line 31 are no longer equal. A portion of the signal energy from line 30 will combine with the signal energy from line 31 and leave hybrid 22 by way of transmission line 38. The balance of the energy in line 30, however, will leave hybrid 22 by way of line 32. This signal component in line 32 is utilized to compensate for the spurious signal transmissions caused by the reflections from the filters.

If we trace the signal as before, taking into account this time the impedance networks 45 and 46, it can be seen that the direct transmission from terminal 42 to transmission line 38 has a value $$T_d' = t\left(\frac{1+\lambda}{2}\right) \quad (4)$$

times the incident signal, where $t$ is the transmission ratio of the filters as before and $\lambda$ is the transmission ratio of the impedance networks 45 and 46. Taking into account the spurious reflected components as before, the transmission from terminal 42 to transmission line 38 resulting from these reflections is given by $$T_r' = t\left(\frac{1+\lambda}{2}\right)\left[\frac{\rho^2\lambda}{1+t^2\left(\frac{1+\lambda}{2}\right)^2}\right] \quad (5)$$

Equation 5, however, does not take into account the unbalance signals caused by the presence of networks 45 and 46. Thus at hybrid 22, the direct transmission $$t\left(\frac{1+\lambda}{2}\right)$$

in transmission line 38 leaves an unbalance component $$t\left(\frac{1-\lambda}{2}\right)$$

in transmission line 32. This unbalance component can be traced as before and is found to generate a signal in transmission line 38 having a value of $$T_u' = -t\left(\frac{1+\lambda}{2}\right)\left[\frac{t^2\left(\frac{1-\lambda}{2}\right)^2}{1+t^2\left(\frac{1+\lambda}{2}\right)^2}\right] \quad (6)$$

Combining this unbalance component with the direct component of Equation 4 and the reflected components of Equation 5, the total transmission between terminal 42 and transmission line 38 is now found to be $$T_t' = T_d' + T_r' + T_u' = t\left(\frac{1+\lambda}{2}\right)\left[1+\frac{\rho^2\lambda - t^2\left(\frac{1-\lambda}{2}\right)^2}{1+t^2\left(\frac{1+\lambda}{2}\right)^2}\right] \quad (7)$$

Equation 7 expresses the total transmission with impedance networks 45 and 46 in the circuit of Fig. 2. It will be noted that the unbalance components are of opposite sign to the reflected components. It is therefore possible to choose λ to have a value such that these two components cancel each other at the ripple frequencies. That is, λ may be chosen such that $$\rho^2\lambda = t^2\left(\frac{1-\lambda}{2}\right)^2 \quad (8)$$

Solving Equation 8 for λ gives $$\lambda = 1 - 2\frac{\rho}{t}\sqrt{1+\tfrac{1}{2}\frac{\rho^2}{t^2}+2\frac{\rho^2}{t^2}} \quad (9)$$

Since $\rho^2/t^2$ is almost equal to zero, λ is approximately equal to unity less $2\rho/t$. The physical significance of the value of λ is that it differs from unity by approximately twice the reflected signal ρ. Since impedance networks 45 and 46 are each in only one leg of the constant resistance networks 18 and 19, respectively, the unbalance signal is thus approximately equal to the reflected signal. That is, $$t\left(\frac{1-\lambda}{2}\right) \doteq \rho \quad (10)$$

$$\lambda \doteq 1 - 2\frac{\rho}{t}$$

The reflected signal components and the unbalance signal components therefore cancel each other and the total transmission is equal to the direct transmission.

It can be seen from Fig. 4 that the low frequency ripple, occurring at frequency $f_a$ where the phase of $t$ is 90 degrees, is significantly larger than the high frequency ripple, occurring at frequency $f_b$ where the phase of $t$ is 270 degrees. It is therefore usually satisfactory to compensate completely for only the low frequency ripple. This overcompensates slightly for the high frequency ripple, causing a slight dip in the loss versus frequency curve of Fig. 4. This can normally be tolerated in a medium sized transmission system. Compensation for a single ripple can be accomplished by the use of a purely dissipative impedance. That is, if it is desired to compensate completely for only the low frequency ripple, a simple resistive pad can be used for networks 45 and 46.

While it is not immediately obvious how such a network, which has a transmission characteristic that is independent of frequency, can compensate for a frequency dependent loss ripple, an indication of this result is shown by Equation 6. From this equation it can be seen that the signal appearing at transmission line 38 which is due to the unbalance signals shows the same form as Equation 5 for the reflected signal components. That is, both the reflection and the unbalance give rise to signals at transmission line 38 which are dependent on the phase of $t$ in the same manner but with opposite sign. The frequency dependency results from the transmission paths which these components traverse rather than the signal components themselves.

If, on the other hand, the constant resistance filters are to be used in a very long transmission system such as a transoceanic submarine cable system, it will be desirable to make the transmission characteristic of the repeaters as flat as possible to reduce cumulative distortions. In this case, it is necessary to compensate for both the high frequency and the low frequency ripples. This is easily accomplished by utilizing an impedance network having the proper value at both of these frequencies.

Figure 5:
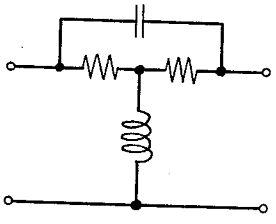
Fig. 5 is a schematic drawing of a bridged-T network suitable for use in the constant resistance repeater of Fig. 2.
Figure 6:
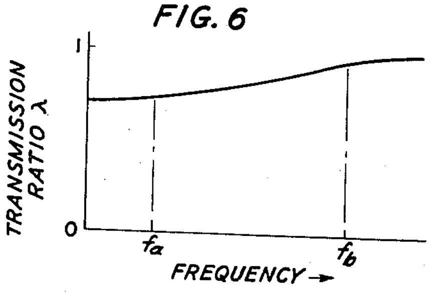
Fig. 6 is a graphical and qualitative representation of the transmission ratio versus frequency characteristic of the bridged-T network shown in Fig. 5.

In Fig. 5 is shown a bridged-T network having the transmission ratio versus frequency characteristic shown in Fig. 6. Thus a simple bridged-T network will provide a transmission ratio which satisfies Equation 9 at frequensy $f_a$ and also at frequency $f_b$. Such a network, when used in the constant resistance repeater of Fig. 2, will compensate completely for both the low frequency ripple, at frequency $f_a$, and the high frequency ripple, at frequency $f_b$. The effect of the impedance networks 45 and 46 at all frequencies other than the ripple frequencies is small and, furthermore, is substantially equal for all of these frequencies. While these networks do make the constant resistance repeater somewhat more lossy, they also cause a considerable improvement in the linearity of the frequency response curve, thus permitting the use of larger repeater gains and less external equalization.

Networks 45 and 46 may, of course, take any other form known in the art which will produce the desired values of λ at the frequencies of interest. The bridged-T network has been described as merely illustrative of one arrangement which will produce this result.

It is understood that the above-described arrangements are simply illustrative of a small number of the many possible specific embodiments which can represent applications of principles of the invention. Numerous and varied other arrangements can readily be devised in accordance with these principles by those skilled in the art without departing from the spirit and scope of the invention.

What is claimed is:

1. In a bilateral carrier wave transmission system, two sections of transmission line, a unilateral amplifier and two band-splitting networks interconnecting said line sections and said amplifier whereby signals traveling in both directions between said line sections traverse said amplifier in the same direction, each of said band-splitting networks comprising two hybrids each having four arms associated in two mutually conjugate pairs, first filter means connecting a first arm of one of said hybrids to a first arm of the other of said hybrids and inverse filter means connecting the paired arm of said first arm of said one hybrid to the paired arm of said first arm of said other hybrid, means connecting a third arm of each of said one and said other hybrid of one of said networks to a third arm of each of said one and said other hybrid of the other of said networks, respectively, means connecting said amplifier between the paired arm of said third arm of one of said hybrids of said one network and the paired arm of said third arm of one of said hybrids of said other network, means connecting the paired arm of said third arm of the other of said hybrids of said one network to one of said line sections and means connecting the paired arm of said third arm of the other of said hybrids of said other network to the other of said line sections, said filter means in said one band-splitting network including a first unbalancing impedance network and said inverse filter means in said other band-splitting network including a second unbalancing impedance network substantially identical to said first unbalancing impedance network.

2. A balanced transmission circuit comprising hybrid means having two pairs of conjugately related arms, a signal source connected to the two arms of one of said pairs, utilization means connected to one arm of the remaining pair and being adapted to receive the combined signal from said two arms of said one pair, a spurious transmission path from said signal source to the other arm of said remaining pair and having a frequency sensitive transmission characteristic which gives rise to ripples in the transmission characteristic of the overall transmission path between said source and said utilization means, and means for unbalancing the amplitudes of the signals applied to said two arms from said signal source to substantially cancel the spurious signal in said other arm of said remaining pair.

3. In a bilateral carrier wave transmission system, a transmission medium, a unilateral amplifier interposed in said transmission medium and separated therefrom by a first and a second constant resistance frequency branching network each having two balanced transmission paths, said branching networks providing spurious reflective transmission paths between said transmission medium and said amplifier, and means in one of said two balanced transmission paths of each of said first and second branching networks for unbalancing the amplitudes of the signals therein to cancel spurious transmissions in said reflective transmission paths.

4. A bilateral repeater for carrier wave transmission systems comprising four hybrid means each having a first and a second pair of mutually conjugate transmission paths, filtering means connecting one path of said first pair of each of two of said hybrid means with a respective one path of said first pair of each of the other two of said hybrid means, inverse filtering means connecting the other path of said first pair of each of said two hybrid means with the respective other path of said first pair of each of said other two hybrid means, first coupling means interconnecting one path of said second pair of each of said two hybrid means, second coupling means interconnecting one path of said second pair of each of said other two hybrid means, input and output means connected to the paired path of said one path of said second pair of each of two of said hybrid means, signal translation means interconnecting the paired path of said one path of said second pair of each of two of said hybrid means, first impedance means interposed between one of said filtering means and one of the connected ones of said two hybrid means, and second impedance means interposed between one of said inverse filtering means and one of the connected ones of said other two hybrid means.

5. The bilateral repeater according to claim 4 wherein said impedance means are wholly resistive.

6. A bilateral repeater for two-wire carrier wave transmission systems comprising four hybrid coils each having a first and a second pair of mutually conjugate terminals, filtering means and impedance means in series connecting one terminal of said first pair of a first hybrid coil and one terminal of said first pair of a second hybrid coil, filter means connecting one terminal of said first pair of a third hybrid coil and one terminal of said first pair of the fourth hybrid coil, inverse filter means connecting the other terminal of said first pair of said first hybrid coil and the other terminal of said first pair of said second hybrid coil, inverse filter means and impedance means in series connecting the other terminal of said first pair of said third hybrid coil and the other terminal of said first pair of said fourth hybrid coil, means connecting one terminal of said second pair of said first hybrid coil and one terminal of said second pair of said third hybrid coil, means connecting one terminal of said second pair of said second hybrid coil and one terminal of said second pair of said fourth hybrid coil, a unilateral amplifier connecting the other terminal of said second pair of said second hybrid coil and the other terminal of said second pair of said third hybrid coil, a first input and output transmission line connected to the other terminal of said second pair of said first hybrid coil, and a second input and output transmission line connected to the other terminal of said second pair of said fourth hybrid coil.

7. The combination according to claim 6 wherein said filter means have a given transmission ratio and a given reflection coefficient and wherein said impedance means have a transmission ratio substantially equal to unity less twice the ratio of said given reflection coefficient and said given transmission ratio.

References Cited in the file of this patent

UNITED STATES PATENTS

| | | |
|---|---|---|
| 2,561,212 | Lewis | July 17, 1951 |
| 2,875,283 | Maione | Feb. 24, 1959 |